United States Patent [19]

Powers

[11] Patent Number: 5,085,173
[45] Date of Patent: Feb. 4, 1992

[54] SELF FEEDER FOR ANIMALS

[76] Inventor: Michael R. Powers, Rte. 1, Hwy. 221, Enoree, S.C. 29335

[21] Appl. No.: 659,228

[22] Filed: Feb. 22, 1991

[51] Int. Cl.⁵ .............................................. A01K 5/00
[52] U.S. Cl. ..................................... 119/53.5; 119/54; 119/56.1
[58] Field of Search ................... 119/54, 51.04, 56.1, 119/57.91, 53.5

[56] References Cited

U.S. PATENT DOCUMENTS

| | | | |
|---|---|---|---|
| 1,000,667 | 8/1911 | Clark | 119/54 |
| 1,350,523 | 8/1920 | Royer | 119/53.5 |
| 2,116,699 | 5/1938 | Hall | 119/54 |
| 2,972,334 | 2/1961 | Braden | 119/53.5 |
| 3,276,630 | 10/1966 | Welch | 119/51.04 |
| 3,515,098 | 6/1970 | Thurmond | 119/51.04 |
| 3,643,632 | 2/1972 | Poirot | 119/54 |
| 3,780,701 | 12/1973 | Wentworth, Sr. | 119/51.04 |

FOREIGN PATENT DOCUMENTS 650580  2/1951  United Kingdom ................. 119/54

Primary Examiner—Robert P. Swiatek
Assistant Examiner—Todd E. Manahan
Attorney, Agent, or Firm—Bailey & Hardaway

[57] ABSTRACT

An animal feeder having a hopper (A) with a shelf-like bottom (B) dispenses a predetermined amount of animal feed into an animal feeding bowl (F). The bowl is supported by a vertical rod (D), which is supported by the bottom and which protrudes through a central passage therein. The act of feeding by the animal moves the bowl, agitating the rod and thereby causing the predetermined amount of feed to be discharged through the central passage and into the bowl.

9 Claims, 4 Drawing Sheets

SELF FEEDER FOR ANIMALS

BACKGROUND OF THE INVENTION

This invention relates to a self feeder for animals having a shelf within a lower portion of a vertical hopper and a feed opening therein for metering feet into a depending bowl carried by a rod extending upwardly through the feed opening into the hopper.

U.S. Pat. Nos. 1,000,667, and 1,027,881 illustrate conical hoppers which converge toward an open bottom and include a pivoted vertical rod fastened near the top of the hoppers carrying a feed bowl beneath the open bottom of the conical hopper. Since the rod is illustrated as extending upwardly through the full lenght of the hoppers and is pivoted at the top, binding results when the hoppers are filled with feed. Therefore, these feeders are ineffective in metering feed through the open conical bottoms of the hoppers. These patents appear to be best suited for feeding domestic animals such as dogs.

U.S. Pat. No. 2,972,334 illustrates a similar feeder which is suitable for feeding wild animals such as derr. The feeder hangs from a tree and has a bolt carrying rod extending upwardly for pivotal support within a hopper.

The following U.S. Pat. Nos. are illustrative of the state-of-the-art: 3,730,142; 3,741,163; 3,780,701; and U.S. Pat. No. 4,270,489.

Accordingly it is an important object of the present invention to provide a hopper having an opening in a shelf like bottom for metering feed by gravity into a bowl carried by a rod supported by the shelf like bottom.

Another important object of the invention is to provide an animal feeder capable of metering a predetermined amount of feed responsive to the action of the animal during feeding.

Still another object of the invention is to provide an animal feeder having an opening for making suitable adjustment to effectively accommodate a variety of feed types.

SUMMARY OF THE INVENTION

It has been found that an animal feeder may be provided which is capable of effective gravity feeding of a predetermined amount of animal feed responsive to action of the animal so that feed is dispensed upon demand from an opening in a central portion of a shelf like hopper bottom which supports a rod for carrying the animal bowl or dish dependinq from the shelf like bottom, and for extending upwardly into the hopper for aiding is dispensing feed.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate a self feeder for animals having a vertical hopper A of substantially circular cross section having an open top for receiving granular animal feed. A shelf like bottom B is formed in the vertical hopper for retaining feed in the hopper. A feed discharge passage consists essentially of an opening in the shelf-like bottom and is defined by sides C in a central portion for discharging feed upon demand of the animal being fed. An upright rod D having a free upper end extends above, below and through the feed discharge passage. Circumferentially spaced transverse supports E extend substantially normal to the upright shaft across the shelf like bottom supporting the upright rod and aiding in the measuring and gravity discharging the feed through the passage. A feeding bowl F is carried by a lower end of the rod having an open top for receiving the feed discharged by gravity therein. The rod extends upwardly into the hopper for a distance wherein movement of the rod aids in agitating the feed sufficiently for feeding a predetermined quantity by gravity into the feeding bowl but less than an amount which would bind or excessively limit movement of the rod. Thus, the animal by the act of feeding moves the bowl and the rod in response thereto sufficiently to meter a desired amount of feed into the bowl.

Figure 7:
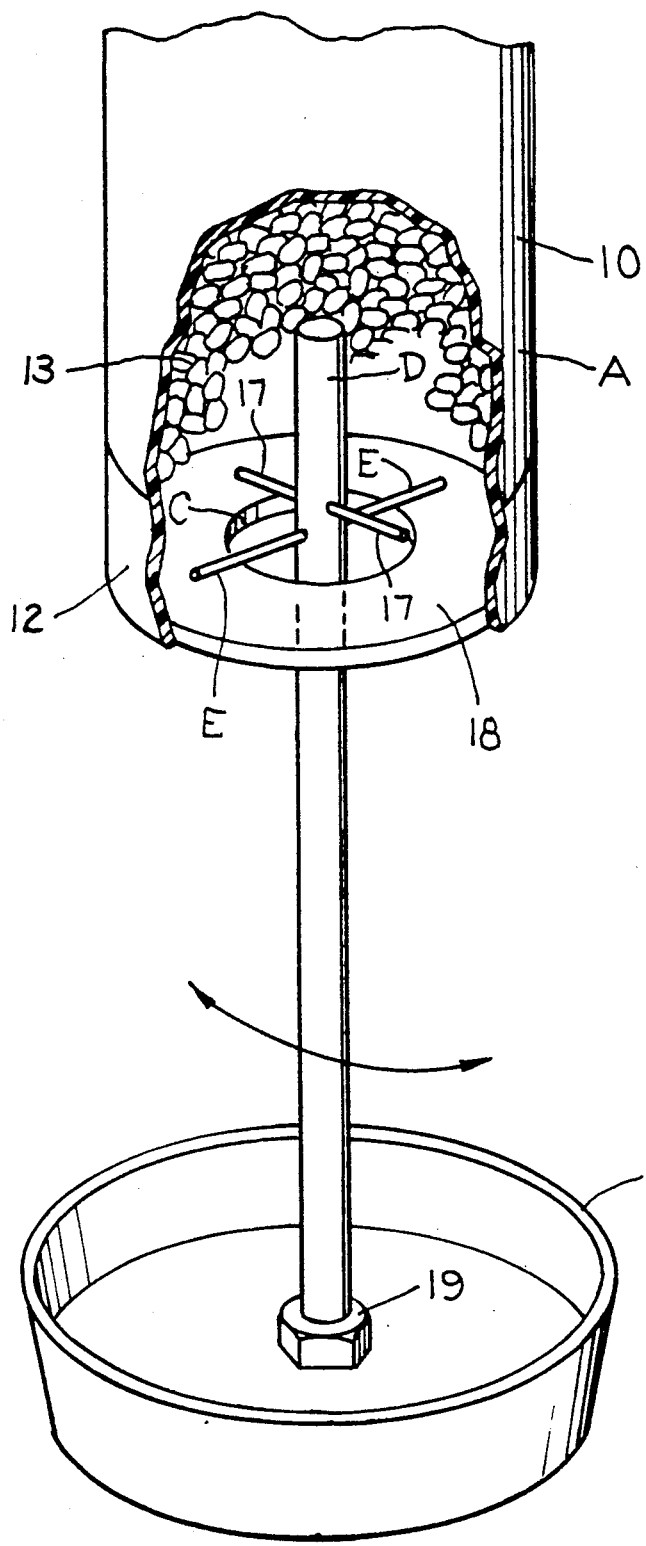
FIG. 7 is an enlarged perspective view illustrating a mounting for the vertical rod with portions of the hopper broken away for purposes of illustration.

A hopper A is illustrated as having cylindrical sides 10 which may be constructed of extruded plastic polymeric material and having a top 11 and a bottom 12. The feed 13 is illustrated in FIG. 7 as being contained within the hopper and supported by the shelf like bottom B. The feed discharge passage is centrally positioned, i.e., spaced from the sides 10 sufficiently to avoid interference with movement of the rod D laterally with respect to the discharge passage defined by the sides C. The rod D should also be so positioned as to meter the feed and avoid bridging thereof during feeding of the animal. The upright rod D is of sufficient size to define a feed opening thereabout within the discharge passage.

It is important to note that the rod D is supported upon the shelf like bottom B by a plurality of circumferentially spaced pins E. In the feeder illustrated opposed pins C are utilized, and the rod pivots about these pins which are supported by the bottom B. Additional pins 17, FIGS. 7 and 8, may be provided to insure proper agitation of the feed as a result of the rocking lateral motion of the shaft D caused by the engagement of the animal with the bowl F during feeding with consequent movement thereof. It has been found that the rod D may extend upwardly of the discharge passage for approximately 5" and less than one-half way up the hopper where the feed being utilized is granular dog feed and produce acceptable results. Other types of feed may be utilized for feeding other animals although the feeder illustrated herein is described in the context of a dog feeder. The bowl F is illustrated as being suitably secured as by a bolt 19 to a lower end of the shaft D.

Figure 8:
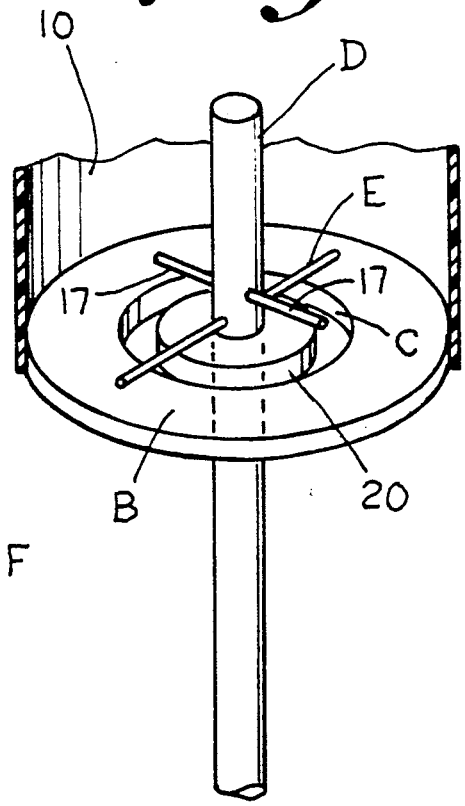
FIG. 8 is an enlarged perspective view illustratinq a modified form of the invention with portions of the hopper broken away.

FIG. 8 illustrates a collar 20 which is removably carried upon the rod D within the discharge passage defined by the sides C so as to vary the effective size of the rod and limit the size of the opening for the feed to accommodate a variety of animal feed such as dog feed or any other type of feed suitable for the animal being fed.

Figure 1:
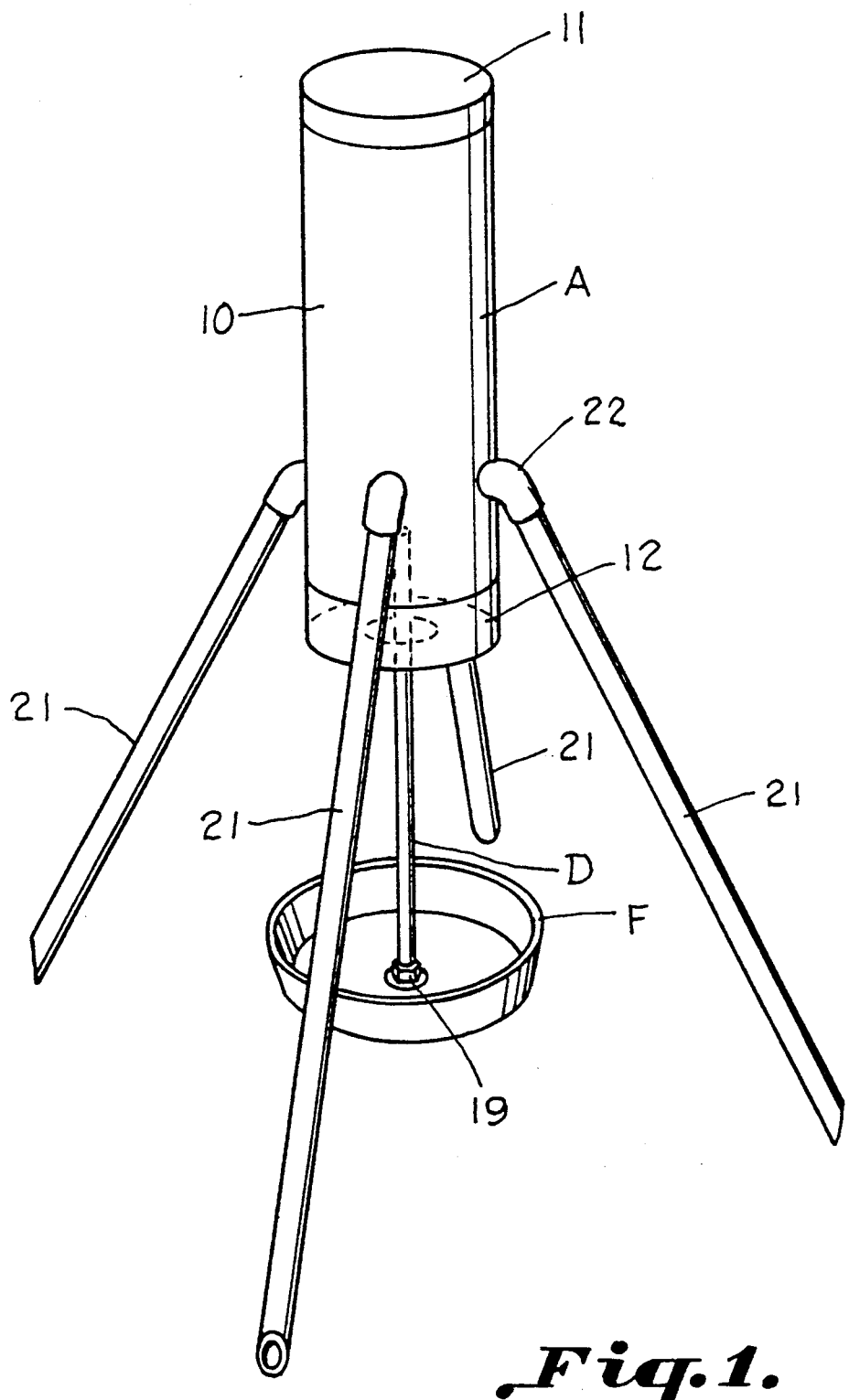
FIG. 1 is a perspective view illustrating a hopper and bowl carried by a rod constructed in accordance with the present invention.
Figure 2:
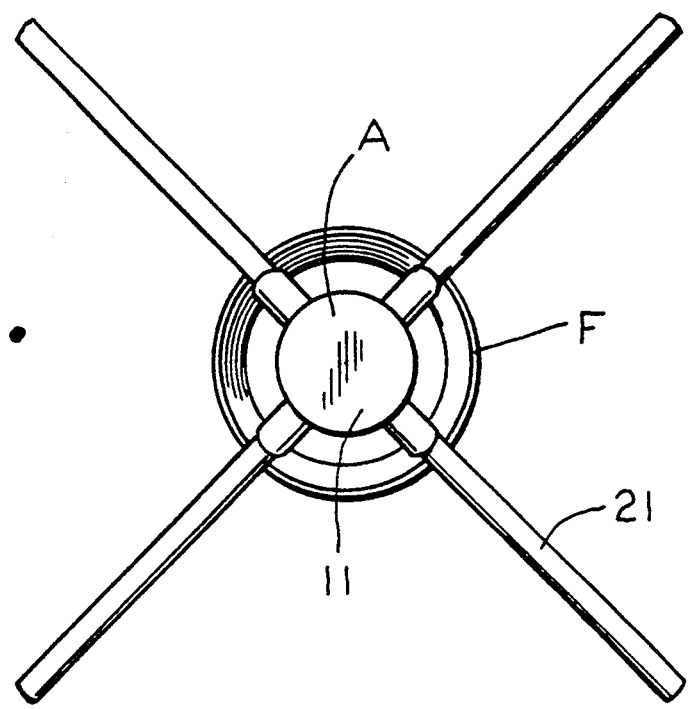
FIG. 2 is a top plan view of the feeder illustrated in FIG. 1.
Figure 3:
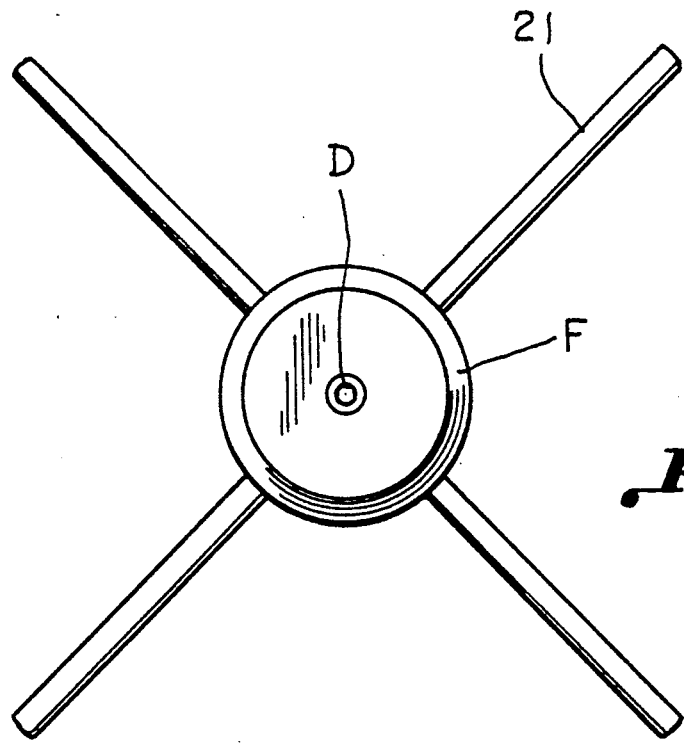
FIG. 3 is a bottom plan view of the feeder illustrated in FIG. 1.
Figure 5:
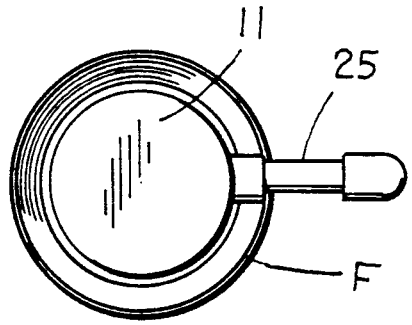
FIG. 5 is a top plan view of the modified form of the invention.

In FIGS. 1 through 3 circumferentially spaced legs 21 are illustrated. These legs extend upwardly and are preferably joined by the fixtures 22 on a lower portion of the hopper A in opposed relation to one another.

Figure 4:
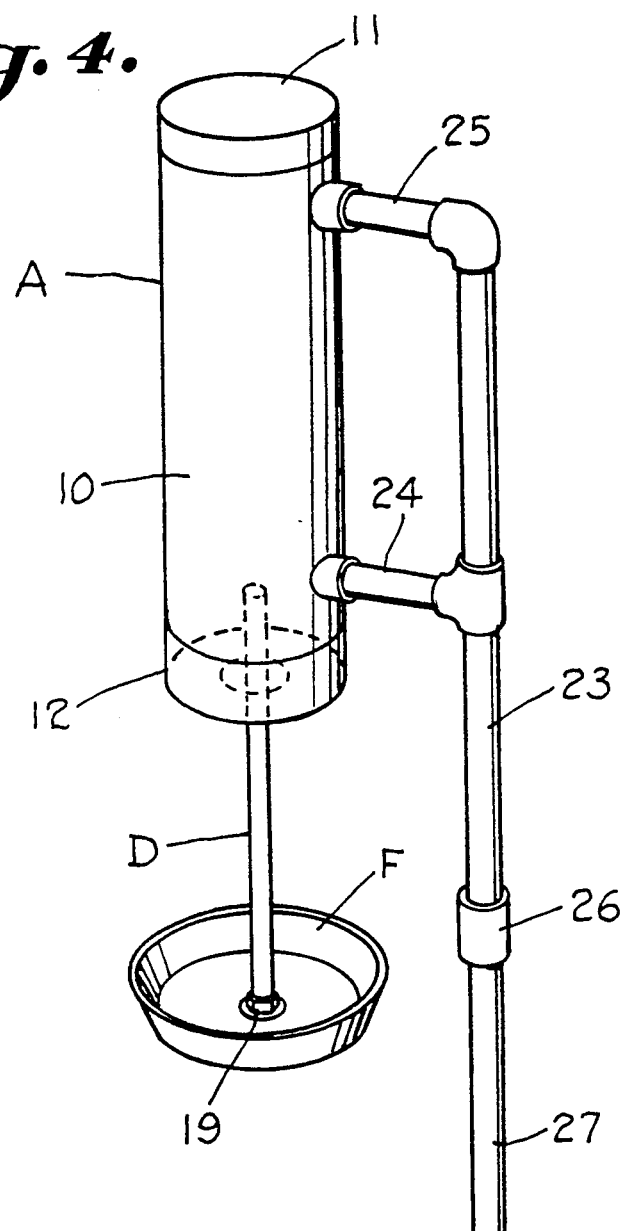
FIG. 4 is a perspective view of an animal feeder constructed in accordance with a modified form of the invention.
Figure 6:
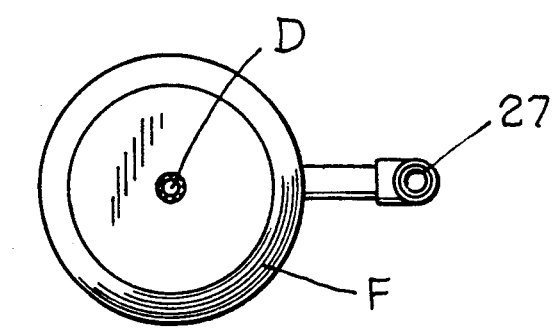
FIG. 6 is a bottom plan view of the modified form of the invention.

A modified form of leg support is illustrated in FIG. 4 wherein a vertical standard 23 is attached by laterally extending members 24 and 25 to the hopper A so that a coupling member 26 joins the vertical leg 23 to a lower support member 27 in the form of a downward extension which may be driven into the earth laterally of the hopper for suitably supporting the hopper A.

It is thus seen that an animal feeder is provided with effective means for dispensing feed by gravity. This is accomplished by extending a rod for a limited distance only into a lower portion of a hopper which is of circular cross section and is preferably an elongated upright cylinder. The hopper has a rod extending downwardly through the feed passage and the rod is supported by a bottom which is in the form of a shelf in order to avoid excessive binding of the agitating rod for effectively metering feed by gravity into a feed bowl by the animal.

While a preferrcd cmbodiment of the invention has been described using specific terms, such description is for illustrative purposes only, and it is to be understood that changes and variations may be made without departing from the spirit or scope of the following claims.

What is claimed is:

1. A self feeder for animals comprising:
    a vertical hopper of substantially circular cross section having an open top for receiving granular animal feed;
    a shelf-like bottom formed in said vertical hopper for retaining said feed in said hopper;
    a feed discharge passaage in said shelf-like bottom consisting essentially of an opening in said bottom for discharging feed upon demand of the animal being fed;
    an upright rod extending aboe, below and through said feed discharge passage;
    said upright rod being of such a size as to define a feed opening thereabout within said feed discharge passage;
    circumferentially spaced transverse supports extending substantially normal to said upright rod across said shelf-like bottom, supporting said upright rod, and aiding in the measuring and gravity discharging said feed through said feed discharge passage;
    a feeding bowl carried by a lower end of said rod having an open top for receiving the feed discharged by gravity therein; and
    said rod extending upwardly into said hopper for a distance wherein movement of the rod aids in agitating the feed sufficiently for feeding a predetermined quantity by gravity into the feeding bowl;
    whereby the animal by the act of feeding moves the bowl and the rod in response thereto sufficiently to feed a desired amount of feed into the bowl.

2. The structure set forth in claim 1 wherein said hopper is an elongated upright cylinder.

3. The structure set forth in claim 1 wherein said rod extends upwardly terminating within a lower portion of said hopper less than about one-half way up the hopper.

4. The structure set forth in claim 3 including a leg support for positioning the hopper and the bowl carried thereby in position for feeding by the animal.

5. The structure set forth in claim 4 wherein said leg support is carried adjacent an upper end of said rod.

6. The structure set forth in claim 5 wherein said leg support includes a plurality of circumferentially sapced legs carried by said hopper.

7. The structure set forth in claim 5 wherein said leg support includes a signle upright leg having a downward extension projection into the earth laterally sapced from said hopper.

8. The structure set forth in claim 1 wherein said circumferentially sapced transverse supports comprise pins carried by said rod and extending across said passage and said shelf-like bottom, said pins supporting said rod, and wherein said passage is substantially circular.

9. The structure set forth in claim 8 including a removable collar about said rod adjacent the passage for adjusting the amount of feed which is gravity fed through said passage.

* * * * *

UNITED STATES PATENT AND TRADEMARK OFFICE
CERTIFICATE OF CORRECTION

PATENT NO. : 5,085,173

DATED : February 4, 1992

INVENTOR(S) : Michael R. Powers

It is certified that error appears in the above-identified patent and that said Letters Patent is hereby corrected as shown below:

Column 1, line 7, change "feet" to --feed--.
Column 1, line 16, change "lenght" to --length.
Column 1, line 24, change "derr" to --deer--.
Column 1, line 53, change "dependinq" to --depending--.
Column 2, line 15, change "illustratinq" to --illustrating--.
Column 2, lines 24, 33, 50 and 60, change "shelf like" to --shelf-like--.
Column 2, line 28, insert after "portion" --thereof--.
Column 3, line 62, change "pins C" to --pins E--.
Column 3, line 18, change "on" to --in--.
Column 3, line 37, change "preferrcd cmbodiment" to --preferred embodiment--.
Column 3, line 49, change "passaage" to passage".
Column 4, line 3, change "aboe" to --above--.
Column 4, line 35, change "sapced" to --spaced--.
Column 4, line 38, change 'signle" to --single--.
Column 4, line 39, change "projection" to --projecting--.
Column 4, line 40, change "sapced" to --spaced--.
Column 4, line 42 change "sapced" to -- spaced pins--.
Column 4, line 43, delete "pins".

Signed and Sealed this

Ninth Day of November, 1993

*Attest:*

BRUCE LEHMAN

*Attesting Officer*  *Commissioner of Patents and Trademarks*